US010076988B1

(12) United States Patent
Ellenbrand et al.

(10) Patent No.: US 10,076,988 B1
(45) Date of Patent: Sep. 18, 2018

(54) AUTOMATED SYSTEM FOR LAYING PIPE

(71) Applicant: ISCO Industries, Inc., Louisville, KY (US)

(72) Inventors: Scott Ellenbrand, New Albany, IN (US); Jeremy Becker, Louisville, KY (US); Michael John Montgomery, Hazel Green, AL (US); Landan Alan Cheney, Billings, MT (US); Shaun Aird Cheney, Camarillo, AZ (US); Robert D. Jones, III, Pearland, TX (US)

(73) Assignee: ISCO Industries, Inc., Louisville, KY (US)

( * ) Notice: Subject to any disclaimer, the term of this patent is extended or adjusted under 35 U.S.C. 154(b) by 0 days.

(21) Appl. No.: 15/422,929

(22) Filed: Feb. 2, 2017

(51) Int. Cl.
B60P 1/04 (2006.01)
B60P 1/38 (2006.01)
B60P 1/16 (2006.01)
B62D 33/08 (2006.01)
B62D 33/02 (2006.01)
B60P 3/40 (2006.01)
F16L 1/024 (2006.01)

(52) U.S. Cl.
CPC ............... B60P 1/04 (2013.01); B60P 1/165 (2013.01); B60P 1/38 (2013.01); B60P 3/40 (2013.01); B62D 33/02 (2013.01); B62D 33/08 (2013.01); F16L 1/024 (2013.01)

(58) Field of Classification Search
CPC .......... B65G 1/0442; B65G 2201/0217; B65G 2201/0276; F16L 1/024; F16L 1/036; F16L 1/0243; F16L 1/065; B60P 1/04; B62D 33/02; B62D 33/0215

USPC ......... 414/745.5, 745.7, 745.9, 746.4, 746.7, 414/353, 470, 482
See application file for complete search history.

(56) References Cited

U.S. PATENT DOCUMENTS 505,829 A   10/1893  Hill
2,780,376 A  2/1957  Sanders
3,421,609 A  1/1969  Schmunk
(Continued)

OTHER PUBLICATIONS

International Search Authority/US: International Search Report and Written Opinion of the International Searching Authority for PCT/US14/38632; pp. 1-5; International Searching Authority/US, United States Sep. 16, 2014.

(Continued)

Primary Examiner — James R Bidwell
(74) Attorney, Agent, or Firm — Middleton Reutlinger

(57) ABSTRACT

Present embodiments provide an automated system for laying pipe which includes various clearing functions in order to clear impingements and jams of pipe being fed to a conveyor or other structure while dispensing the pipe from the trailer. Some embodiments include uprights which are adjustable to increase the carrying capacity of piping. Other embodiments provide adjustable members which raise and lower to aid in clearing the pipe. Other embodiments provide a gate or arm which may be actuated to push or hold pipes back allowing one pipe to feed at a time. Still further, a transition cradle may be utilized to hold pipes back and actuate a single pipe. These features allow for clearing of various types of jams in the feed process so that a single pipe may be cleanly actuated to a conveyor for feeding from the vehicle.

11 Claims, 15 Drawing Sheets

(56) References Cited

U.S. PATENT DOCUMENTS

| | | | |
|---|---|---|---|
| 3,565,269 | A | 2/1971 | Martin |
| 3,667,620 | A | 6/1972 | Steiro |
| 3,706,347 | A | 12/1972 | Brown |
| 3,780,883 | A | 12/1973 | Brown |
| 3,956,901 | A | 5/1976 | Brown |
| 4,093,082 | A | 6/1978 | Goodsell |
| 5,358,371 | A | 10/1994 | Neddo |
| 5,556,253 | A | 9/1996 | Rozendaal et al. |
| 7,037,042 | B2 | 5/2006 | Wilkinson |
| 7,149,600 | B2 | 12/2006 | Rippolone |
| 7,179,019 | B2 | 2/2007 | Seto et al. |
| 7,261,493 | B2 | 8/2007 | Wilkinson |
| 7,458,750 | B2 | 12/2008 | Fulton |
| 7,473,065 | B2 | 1/2009 | Wells |
| 7,736,119 | B2 | 6/2010 | Belik |
| 9,080,693 | B2 * | 7/2015 | Cheney .................. F16L 1/036 |
| 2005/0226709 | A1 * | 10/2005 | Koster .................. A01D 90/08 414/501 |
| 2009/0263221 | A1 | 10/2009 | Oldershaw |
| 2010/0074689 | A1 | 3/2010 | Lykins |
| 2013/0129458 | A1 | 5/2013 | Cheney |

OTHER PUBLICATIONS

MGS Public Utility Products, Public Utility Transportation Systems, 10K Capacity Pipe Fusion, Model #PHD95, 2 pages, Denver, PA Jun. 1, 2013.

\* cited by examiner

AUTOMATED SYSTEM FOR LAYING PIPE

BACKGROUND

1. Field of the Invention

Present embodiments relate to an automated system and method for laying pipe. More specifically, present embodiments provide a system for laying pipe which may be towed or mounted on a powered vehicle to carry and dispense pipe at a job site.

2. Description of the Related Art

Current systems for laying pipe systems generally may carry the pipe to a location and dispense from a carrier of some sort. However, some pipes are difficult to dispense from the carrier because the material used to form the pipe may allow for some flexing and bending. This results in binding of the pipe and an inability to dispense the pipes from the carrier. As a result, pipes are needed to be manually cleared of the impingements that occur and this can be difficult and/or dangerous due to larger sizes of some pipes.

It would be desirable to overcome issues with dispensing pipe so that an automated system may be provided which works in automated fashion and clears jamming of the pipes during the dispensing operation.

The information included in this Background section of the specification, including any references cited herein and any description or discussion thereof, is included for technical reference purposes only and is not to be regarded subject matter by which the scope of the claims are to be bound.

SUMMARY

Present embodiments provide an automated system for laying pipe which includes various clearing functions in order to clear impingements and jams of pipe being fed to a conveyor or other structure which dispensing the pipe from the trailer. Some embodiments include uprights which are adjustable to increase the carrying capacity of piping. Other embodiments provide adjustable members which raise and lower to aid in clearing the pipe. Other embodiments provide a gate finger or arm which may be actuated to push or hold pipes back allowing one pipe to feed at a time. Still further, a rotatable transition cradle may be utilized to hold pipes back and actuate a single pipe. These features allow for clearing of various types of jams in the feed process so that a single pipe may be cleanly actuated to a conveyor for feeding from the vehicle.

According to some embodiments, a trailer for carrying and off-loading pipe comprises a frame, a plurality of wheel assemblies connected to the frame to support the frame and provide mobility for the trailer, a plurality of uprights to support stacking of pipes vertically on the trailer, a gate mount extending from at least one of the plurality of uprights and actuatable gate extending from the gate mount, the gate movable between a first position and a second position, a plurality of articulating gravity members disposed on the trailer which direct piping toward one side of the trailer and, the articulating gravity members being movable to disengage impingement between pipes and at least one of the gate mount and the gate.

Optionally, the following embodiments may be utilized alone or in combination with the trailer. The gate mount may be fixed on the at least one of the plurality of uprights. The gate mount may be position adjustable on the at least one of the plurality of uprights. Further, the gate mount may be adjustable to provide a coarse adjustment. The gate may provide a fine adjustment. The trailer may further comprise a conveyor to receive and to discharge the pipes. The plurality of uprights on at least one side of the trailer may be movable laterally to expand width capacity. The trailer may further comprise a headache rack at a forward end of the trailer. The plurality of articulating gravity members may be movable from a substantially flat position to an angled position wherein the angled position may direct the pipes toward a conveyor. The trailer may further comprise a hydraulic system to move the articulating gravity members. The trailer may further comprise a transition cradle. The transition cradle may be adjustable. The transition cradle may pivot relative to the gravity member. The transition cradle may have a rounded rear edge. The transition cradle may be positioned on the gravity member. The trailer may further comprise a linkage and actuator connected to the gravity member and the transition cradle, respectively. The trailer may further comprise a hydraulic system disposed on the trailer. The adjustable gate may be pivotally connected to the gate mount. The adjustable gate being extendable from and retractable toward the gate mount.

According to some embodiments, a trailer for carrying and dispensing a plurality of pipes comprises a frame and a plurality of wheel assemblies to rotatably support the frame. A plurality of uprights may be disposed about the trailer to retain the pipes on the trailer. A plurality of articulating gravity members defining a floor for the pipes, the articulating gravity members being adjustable between a substantially flat position and an angled position. The angled position directing the pipes toward one side of the trailer and, at least some of the plurality of uprights being adjustable laterally to vary a width of the trailer.

Additionally, the following optional embodiments may be used alone or in combination. The trailer may further comprise a gate mount extending from the uprights. The upright may be adjustable to vary height of the uprights. The trailer may further comprise an actuatable gate extending from the gate mount. At least one of the gravity members and the actuatable gate may be moved to remove an impingement of the pipes. The articulating gravity members may be movable to remove an impingement of the pipes. The trailer may further comprise a conveyor disposed along one side of the trailer. The trailer may further comprise at least one rack at one of a forward and rearward end of the trailer. The trailer may further comprise a transition cradle having a notch and a rounded rear edge disposed on the articulating gravity members. The trailer may further comprise a linkage extending along the articulating gravity members. The trailer may further comprise an actuator operably connected to the linkage and the transition cradle.

According to some embodiments, a trailer comprises a frame and a plurality of wheel assemblies which rotatably support the frame, a plurality of uprights to support pipes in the trailer, a gate mount extending from at least one of the plurality of uprights, a plurality of articulating gravity members which pivot from first, less angled position to a second, more angled position, a transition cradle extending from the guide and rotatable to move the pipes to a conveyor.

Additionally, the following optional embodiments may be used alone or in combination. The trailer may be extendable in a longitudinal direction. The upright may be movable to vary width of said trailer. The trailer may further comprise an insert to vary a size of a notch.

All of the above outlined features are to be understood as exemplary only and many more features and objectives of the automated system for laying pipe may be gleaned from the disclosure herein. Therefore, no limiting interpretation of this summary is to be understood without further reading of the entire specification, claims, and drawings included herewith.

BRIEF DESCRIPTION OF THE DRAWINGS

In order that the embodiments may be better understood, embodiments of the automated system for laying pipe will now be described by way of examples. These embodiments are not to limit the scope of the claims as other embodiments of the automated system for laying pipe will become apparent to one having ordinary skill in the art upon reading the instant description. Non-limiting examples of the present embodiments are shown in figures wherein:

DETAILED DESCRIPTION

Figure 1:
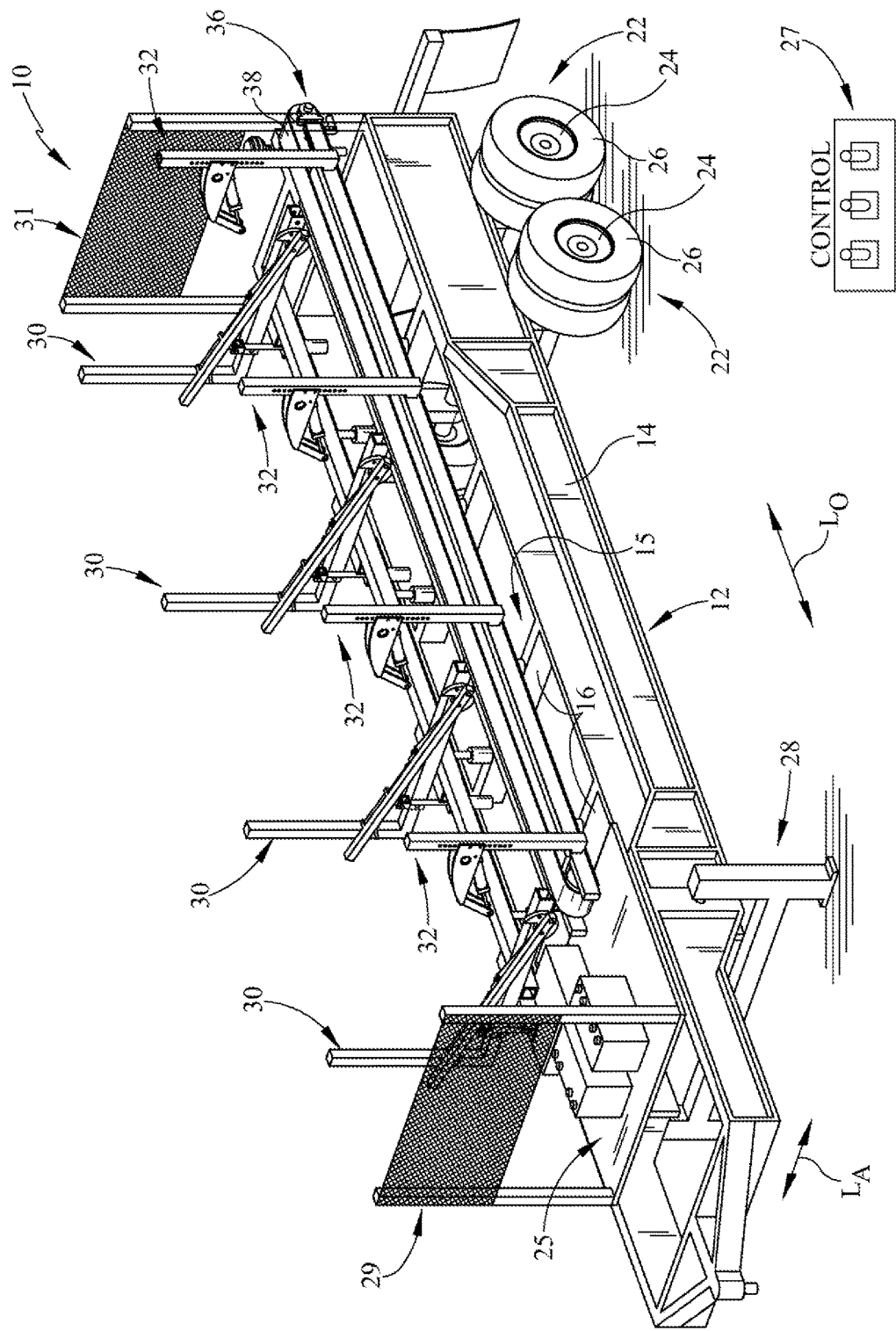
FIG. 1 is a front perspective view of an automated system for laying pipe and a vehicle for moving the system.

It should be understood that the automated system for laying pipe is not limited in its application to the details of construction and the arrangement of components set forth in the following description or illustrated in the drawings. The embodiments are capable of other features and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the figures, wherein like numerals indicate like elements throughout several views, there are shown in FIGS. 1 through 15 various embodiments of an automated system for laying pipe. The system includes a vehicle which feeds pipes of various sizes in a stringing project from a first location to a second location. The vehicle has various features which allow the clearing of jams including raising and lowering the pipes at one lateral side of the vehicle. A second feature provides for moving some number of pipes away from a conveyor to also aid in clearing any jams which are sometimes caused due to the flexibility of plastic pipe, which may be installed above or below ground. Finally, a third feature is utilized to hold pipes back in the stack while actuating a single pipe to a conveyor or other feed structure.

Referring now to FIG. 1, a perspective view of the automated system for laying pipe is depicted. The system comprises a vehicle 10 which may be embodied by a trailer as shown or alternatively, the system may include a flatbed portion of a powered vehicle rather than a towable vehicle. In a further alternative embodiment, a combination of powered and towable vehicles may be utilized. The depicted embodiment, which is non-limiting, includes a frame 12 which is defined by at least one longitudinal member 14. The longitudinal member 14 may include various lengths which may be dependent on a maximum length of pipe to be distributed. The frame 12 may also include at least one latitudinal member 16. In the instant embodiment, the at least one longitudinal member 14 is embodied by two longitudinal members and a plurality of latitudinal members 16 which extend between the two longitudinal members 14. Other features and/or shaped frame designs may be utilized. The longitudinal members 14 may be of a constant or variable web thickness depending on the anticipated load of piping to be carried and the length of the member 14. Similarly, the latitudinal members 16 may be of constant or may be varying web depth or thickness depending upon the loading anticipated to be carried by the vehicle 10. The members 14 may be formed of one or more parts which may be of fixed length, the members 14 may be telescoping to allow use with longer or shorter pipes. The members 14, 16 may be bolted together or welded together and provide moveable support by at least one wheel assembly 22.

The longitudinal members 14 and the latitudinal members 16 also define a bed 15 upon which a plurality of supports 30, 32 and a conveyor 36 or other structure for moving pipe may be located and utilized.

At the rear of the frame 12 is at least one wheel assembly 22 which may comprise at least one wheel 24 and at least one tire 26. In the depicted embodiment, there are two axles each with one or more wheel assemblies 22 which may be more desirable for heavier loads. Still further, a wheel assembly may be a wheel structure, with or without a tire that operates in combination with a set of tracks or rails. At the front of the frame 12 may be an adjustable trailer stand 28. At the front of the frame 12 may be a fifth wheel hitch, for example for connecting to a tractor, truck, or other pulling vehicle. However, other embodiments of hitches may be used and still other embodiments may comprise a truck with a flat bed, for example upon which the automated system and its various components may be mounted.

Referring still to FIG. 1, the vehicle 10 comprises a plurality of upright supports 30, 32 extending from the position above the frame 12. The upright supports 30 are adjustable in a lateral direction. The lateral direction is generally defined as perpendicular to the longitudinal direction members 14 and parallel to the latitudinal members 16. The lateral movement of the upright supports 30 increases the capacity of the trailer to carry pipes and allows for narrowing where, for example, the vehicle 10 travels over the road and width limitations of over-the-road vehicles are more important. However, at a job site, where pipe may be loaded into the vehicle 10, the upright supports 30 may be expanded, if desired, to increase the carrying capacity without the limitations of wide-load carrying over the road. The expansion may also be desirable where not only a larger capacity of pipes is desired but where the pipes are of larger size, for example, and the desire to load higher numbers of pipes in the vehicle bed requires such expansion to improve operating efficiency in the pipe laying process. The upright supports 30, 32 may also be adjusted vertically to vary the height as another way for example to vary the amount of loading capability of the vehicle 10. Such adjustability may be achieved by screw-type adjustment or by telescoping and pinning, for non-limiting example.

Located adjacent to the uprights 30, 32 is a conveyor 36. The conveyor 36 is just one of numerous embodiments which may move the pipe from on the vehicle 10 to off of the vehicle 10. The conveyor 36 may be embodied by a belt conveyor, as depicted, including a belt 38 or alternatively may be embodied by a roller conveyor or other static or dynamic structures capable of moving the pipe. These may be actuatable or may, for example, use gravity to move the pipes.

At the front of the frame 12 a platform 25 is depicted which may provide support for various functional components such hydraulic reservoir and pump or electrical systems including, but not limited to, batteries or combinations of hydraulic and electric or other components, for non-limiting pneumatic components, that may be utilized in the operation of the pipe laying system. Any or all of these fluid or electrical components may be utilized alone or in combination with the present embodiments for control and/or actuation.

Disposed above the platform 25 is a rack 29 which stops pipes from sliding forward. Additionally, a similar rack 31 may be installed at the rear end of the vehicle 10 to prevent pipes from sliding rearward from the vehicle 10. These racks 29, 31 may be formed in various manners and according to the instant embodiment include a pair of opposed uprights and an expanded metal or sheet metal extending between the uprights. The height may be dependent upon the height of the pipes when stacked between the supports 30, 32 and may be fixed or adjustable.

Also shown in FIG. 1, is a controller 27 which may have one or more controls to operate the vehicle 10 and move pipes. The controller 27 may have wired connections or may utilize wireless communication standards, such as Wi-Fi, Bluetooth or zigbee for non-limiting example. Still further, the controller 27 may be embodied by a smart tablet/pad. Communication or other control device(s) may be located at various locations of the vehicle 10, for example the platform 25.

Figure 2:
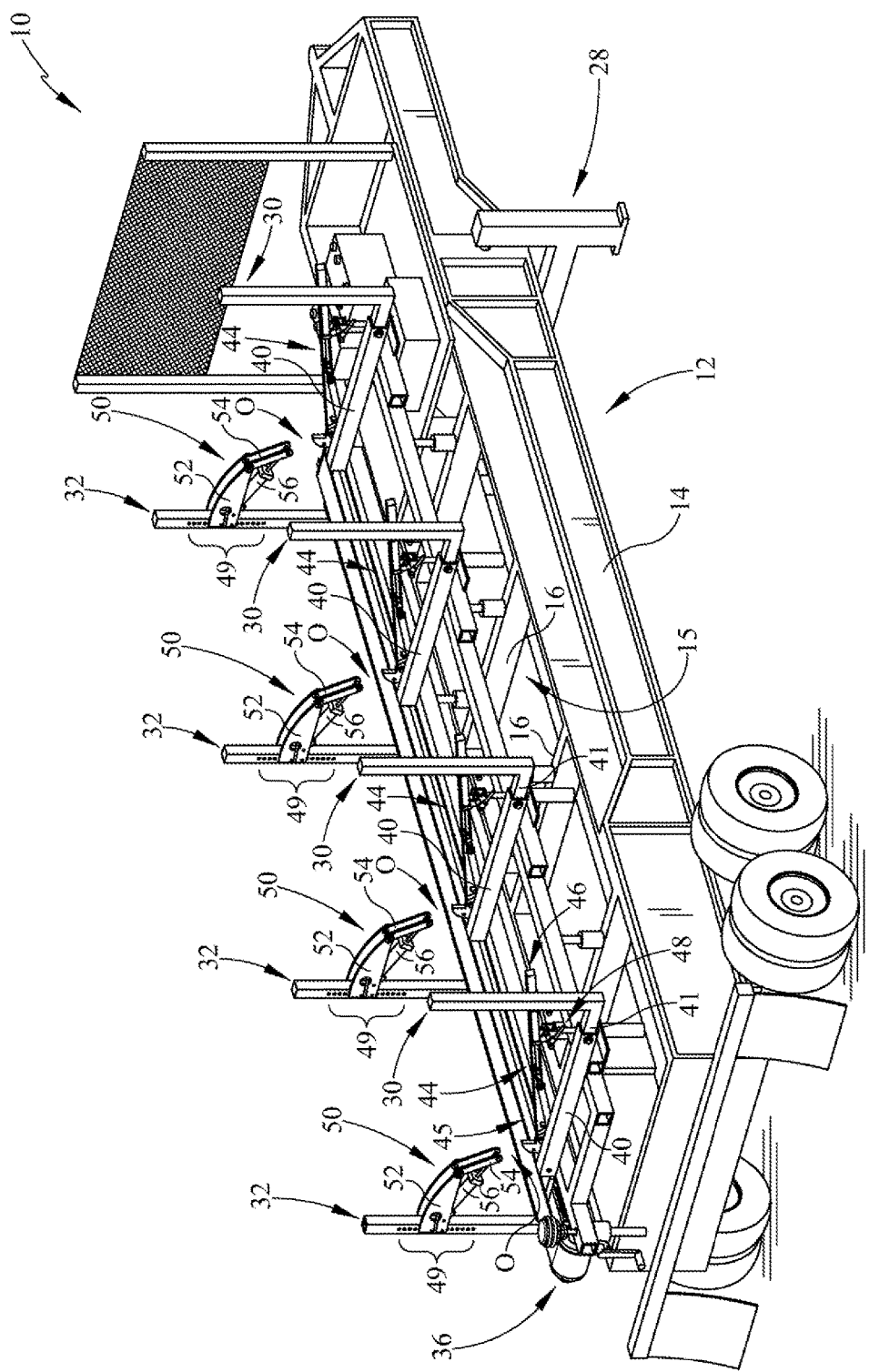
FIG. 2 is a rear perspective view of the system as shown from the opposite side of the vehicle as that shown in FIG. 1.

Referring to FIG. 2, a rear perspective view of the vehicle 10 as shown from the opposite side as that shown in FIG. 1. In this view, the upright supports 30 are depicted and a lateral sleeve 40 is shown. The lateral sleeves 40 are supported along the latitudinal members 16. The sleeves 40 may be elevated or may be disposed on the members 14, 16. The upright supports 30 slide linearly and horizontally within and through the sleeves 40 which provide guided movement for the movement of the supports 30 into or away from bed 15. As previously described, these supports 30 may move to widen the area which carries the plurality of pipes. The sleeves 40 receive a horizontal portion 41 of the upright support 30 and the horizontal portion 41 may include a plurality of holes which receive a pin or other fastener to lock the upright support 30 at a pre-selected width relative to the opposite supports 32. Further, while the sleeve 40 is shown as receiving the horizontal portion of the upright supports 30, it should be understood by one skilled in the art that the horizontal portion 41 may be larger so as to receive and slide on to a lateral support shown in the position of the sleeves 40. Similarly, while the cross-sectional shapes of these structures are shown as square, other cross-sectional shapes may be utilized in accordance with the instant embodiments.

The sleeves 40 are disposed on the bed 15 of the vehicle 10 and provide a base or bottom upon which pipes may be disposed. The bed 15 is an area where pipes P (FIG. 3) may be stored and is generally bounded by uprights 30, 32 and the frame below. The lower portion of the bed 15 may be bounded by either or both of the sleeve 40 and a gravity member 44 as shown in the instant embodiment. The plurality of gravity members 44 are shown adjacent to the sleeves 40 and extending upwardly at an opposite end toward the upright supports 30. The gravity member 44 comprises a first end 45, closer to the upright supports 32 and the conveyor 36 and a second end 46, closer to the upright support 30. The gravity members 44 are pivotally connected near a first end 45 to the sleeves 40. The gravity member 44 is supported near the first end 45 by the pivoting connection and toward the second end 46 by an actuator 48. The actuator 48 moves the gravity member 44 up and down near the second end 46 and causes pivoting of the gravity member 44 toward the first end 45 thereby changing the angle of the gravity member 44 relative to the sleeves 40 and the vehicle bed 15.

The function of the gravity member 44 in its angled position is to direct pipes laying thereon toward the conveyor 36. However, certain pipes which use, for example polyethylene, may exhibit some flexing which when stacked, may cause some slight intertwining of the pipes and binding. When this occurs, the up and down of the gravity members 44 may be helpful to free a bind, jam or impingement of the pipes P trying to move toward the conveyor 36.

On the opposite side of the conveyor 36 are the upright supports 32. In the instant embodiment, these supports 32 are fixed and do not move in a lateral direction in order to widen or narrow the payload capability of the vehicle 10. The upright supports 32 also provide a bound for pipes so that the pipes do not fall off of the conveyor 36.

The upright supports 32 have a plurality of adjustments or holes 49 for a gate assembly 50. The gate assembly 50 includes a gate mount 52 which connects to the upright supports 32 and may be positioned to a desired height by using the holes 49. In some embodiments, the gate mount 52 may be fixed at a vertical position. The mount 52 extends from the upright support 32 toward the area of the vehicle 10 wherein the pipes are positioned and stored. Near an end of the mount 52 is a gate 54 which pivots relative to the mount 52 and by way of an actuator 56. The gate 54 moves toward the pipes seated on the gravity members 44. The gate 54 moves between first and second positions to define a space or opening O between the gravity member 44 and the end of gate 54 through which a single pipe can pass. Alternatively, the opening O may be defined between the gate 54 and the sleeve 40 or the bed 15, more generally. This height may be adjusted in part by the movement of the mount 52 on the upright support 32 and by movement of one of an extended position or retracted position of the gate 54.

Further, the movement of the gate 54 may provide a fine adjustment as to the height of the opening O through which a pipe can pass to the conveyor 36. A further function of the gate 54 is that when the gate 54 moves outwardly toward the pipes on the gravity members 44, the pipes are held or pushed back away from conveyor 36, generally so that a lower pipe may more easily pass to the conveyor 36. Finally, this movement of the gate 54 may occur with or without movement of the gravity members 44 to aid in clearing an impingement or pipe jam.

Figure 3:
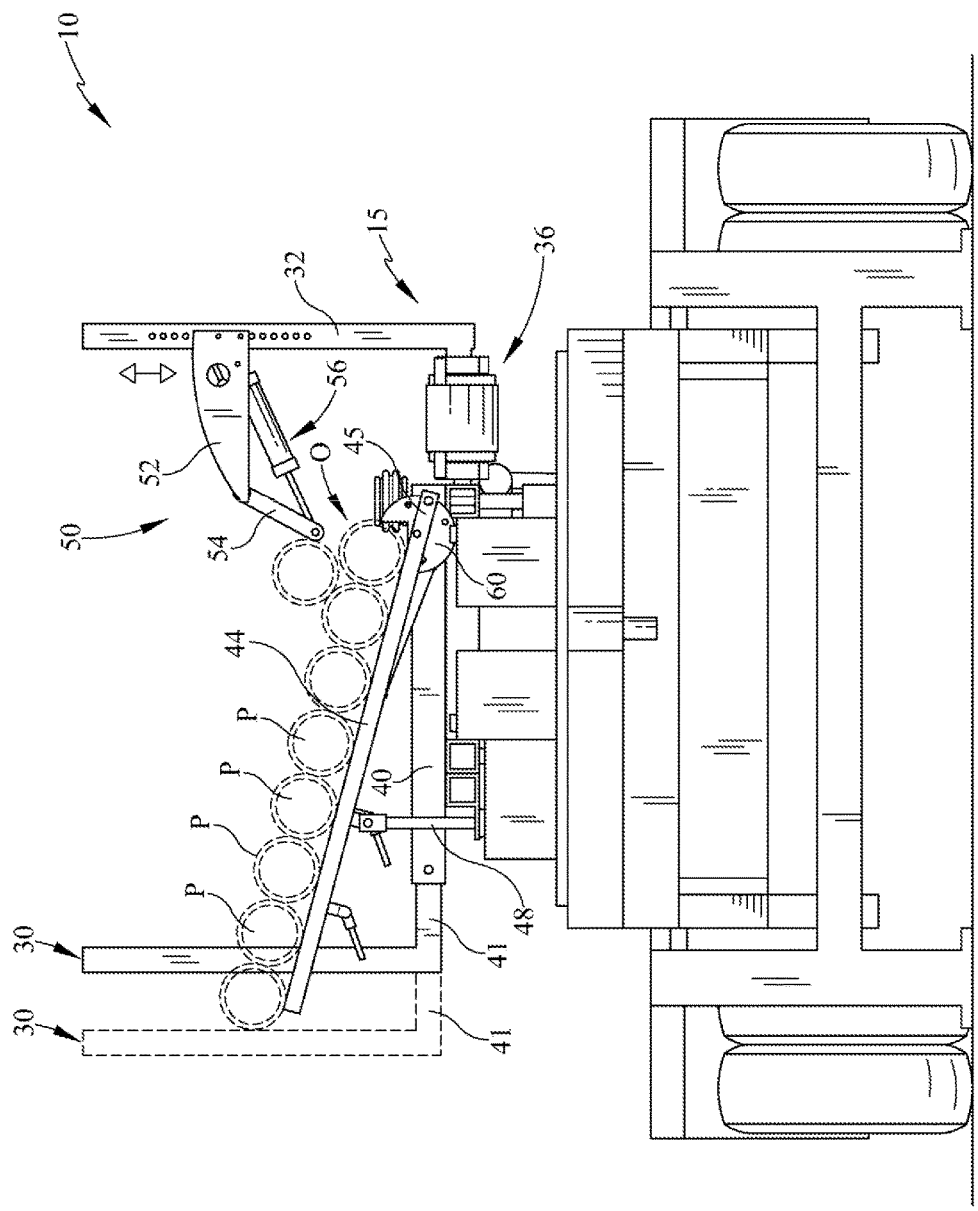
FIG. 3 is a front view of the system, including adjustable uprights.

Referring now to FIG. 3, a front view of the vehicle 10 is depicted. In this view, the upright supports 30 are shown in a solid line and in a broken line position. The upright supports 32 are shown in solid line depicting a narrow position extending further into the sleeve 40 such that the payload of pipes P is decreased but the vehicle 10 is better suited for over-the-road travel without the need for a wide load designation. The upright support 30 is also shown in broken line showing an extended position relative to the sleeve 40. In this wider configuration, the vehicle 10 may carry a larger number of pipes and this is better suited for job site usage where it may be desirable to load the vehicle 10 with a large number of pipes or when utilizing pipes of a larger size diameter. The movement of the upright support 30 relative to the sleeve 40 may be fixed by a pin or other fastener which passes through the sleeve 40 and a horizontal portion 41. Various structures may be used to lock the horizontal portion 41 relative to the sleeve 40 so that the upright support 30 cannot change positions.

Further, in the instant embodiment, the fixed support 32 is shown extending upright from at a location inside the wheel assemblies 22 (FIG. 1) below. In other embodiments, the fixed support 32 may be located further outwardly from the center of the vehicle 10 and over the wheel assemblies 22 (FIG. 1). The width of the vehicle 10 may be dependent upon over the road regulations. The width of the supports 30, 32 may be at various locations and should not be considered limited by the embodiment shown.

Also shown more clearly in this view is the gravity member 44. The gravity member 44 is shown with the actuator 48 in an extended position so that the pipes P are directed toward the first end 45 of the gravity member 44 and toward the conveyor 36. The actuator 48 may be fluid (hydraulic and/or pneumatic) or electric and may further be linear or may be rotational to move linearly. Various actuators may be utilized.

In this view, the gate 54 is clearly shown performing its function of holding back pipes P from falling into the space between the lower end of the gate 54 and the gravity member 44. Accordingly the height of the mount 52 may be roughly adjusted on the upright support 32 to provide a rough height adjustment of the gate 54 relative to the gravity member 44 and secondly, the gate 54 may be adjusted by way of the actuator 56 to provide a more fine adjustment for holding back the pipes P, which are shown in broken line on the gravity member 44. These adjustments may be made to vary the space or opening O for movement of the pipes P to the conveyor 36.

It should also be noted that while the pipes P are shown arranged on the gravity member 44 in an organized fashion, these may be dumped from a forklift or other large equipment on to the vehicle 10 and may become bound or otherwise not cleanly arranged as shown. This arrangement may create problems of impingement or binding of the pipes trying to feed to the conveyor 36. The gate 54 may also be moved from the position depicted outwardly, or into the pipes, to push the pipes back to aid in clearing such jam or impingement.

A space or opening O is defined between the gate 54 and the gravity member 44 which allows for a single pipe P to pass therethrough onto the conveyor 36. This space or opening O aids to allow passage of only one pipe while holding back the remainder of pipes from moving in an uncontrolled manner toward the conveyor 36. A transition cradle 60 may be disposed beneath gate 54 in the space or opening O to direct movement of pipes P on to the conveyor 36.

Figure 4:
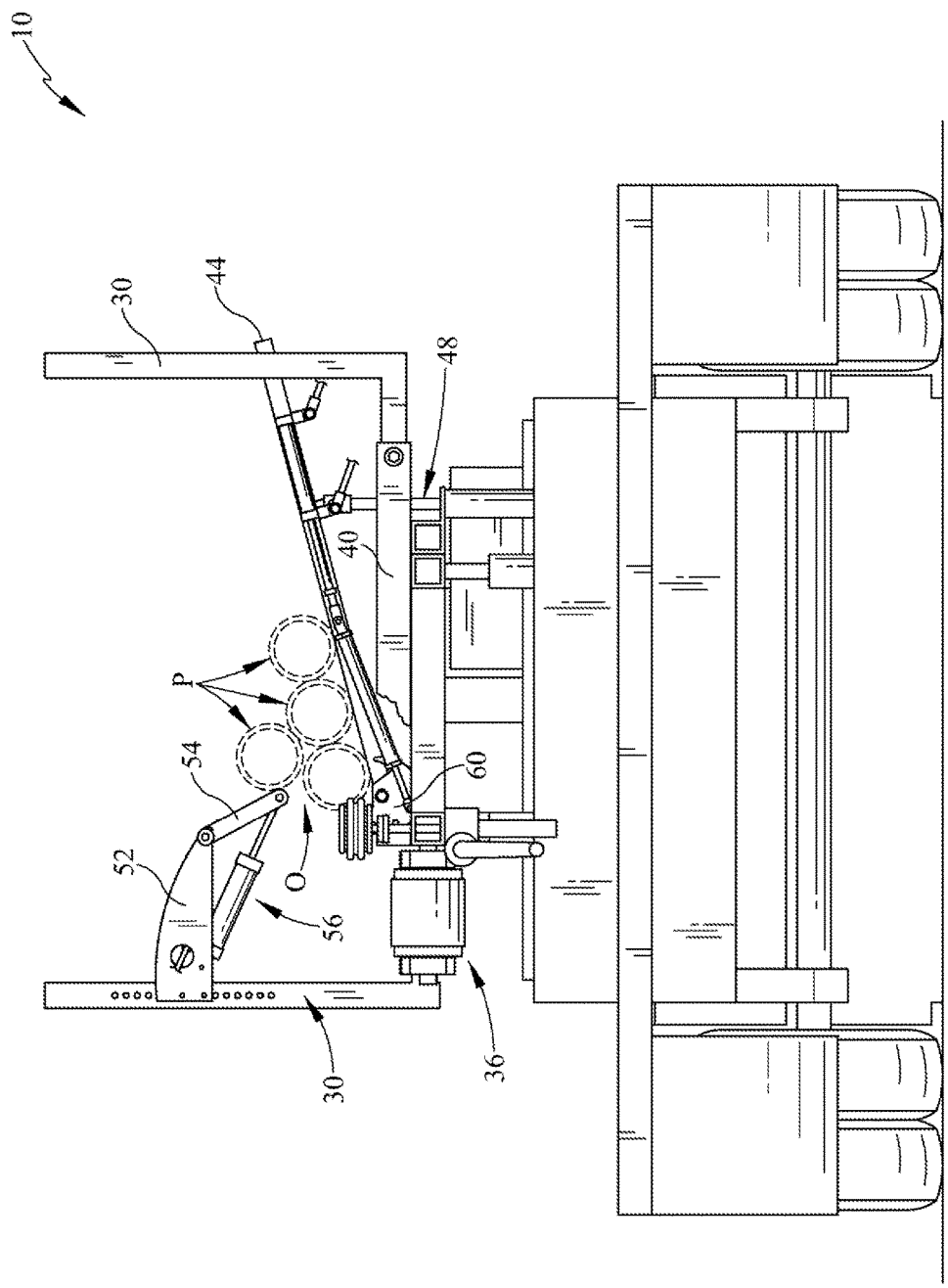
FIG. 4 is a rear view of the system, including a gravity member in a first position.

Referring now to FIG. 4, a rear view of vehicle 10 is depicted. The pipes P are shown in a rear view which is generally opposite that of FIG. 3. The gravity member 44 is shown in an upward position as noted relative to the upright supports 30. The gravity member 44 may move up and down by way of the actuator 48 and a pivot position of the gravity member 44. In this upward position, the gravity member 44 is angled which causes the pipes P to roll or otherwise move toward the conveyor 36. As previously discussed, the gate 54 defines an opening O between a lower end of the gate 54 and gravity member 44 wherein a single pipe P may move therethrough. The gate 54 can push pipes causing a jam toward upright 30 improving pipe feed to conveyor 36 and clearing jams.

The actuator 48 is extended to position the gravity member 44 in this upward position. The actuator 48 may be defined by a linear actuator such as a hydraulic cylinder piston or an electric solenoid or, for example a rotary actuator which rotates to either extend or retract relative to a correspondingly threaded piece. Any of these or other actuators may be utilized to move the gravity member 44 between at least two positions, an upper position being depicted in FIG. 4.

This depicted position causes the movement of the pipes P to a transition cradle 60 which controls movement of the single pipe P on to the conveyor 36.

Figure 5:
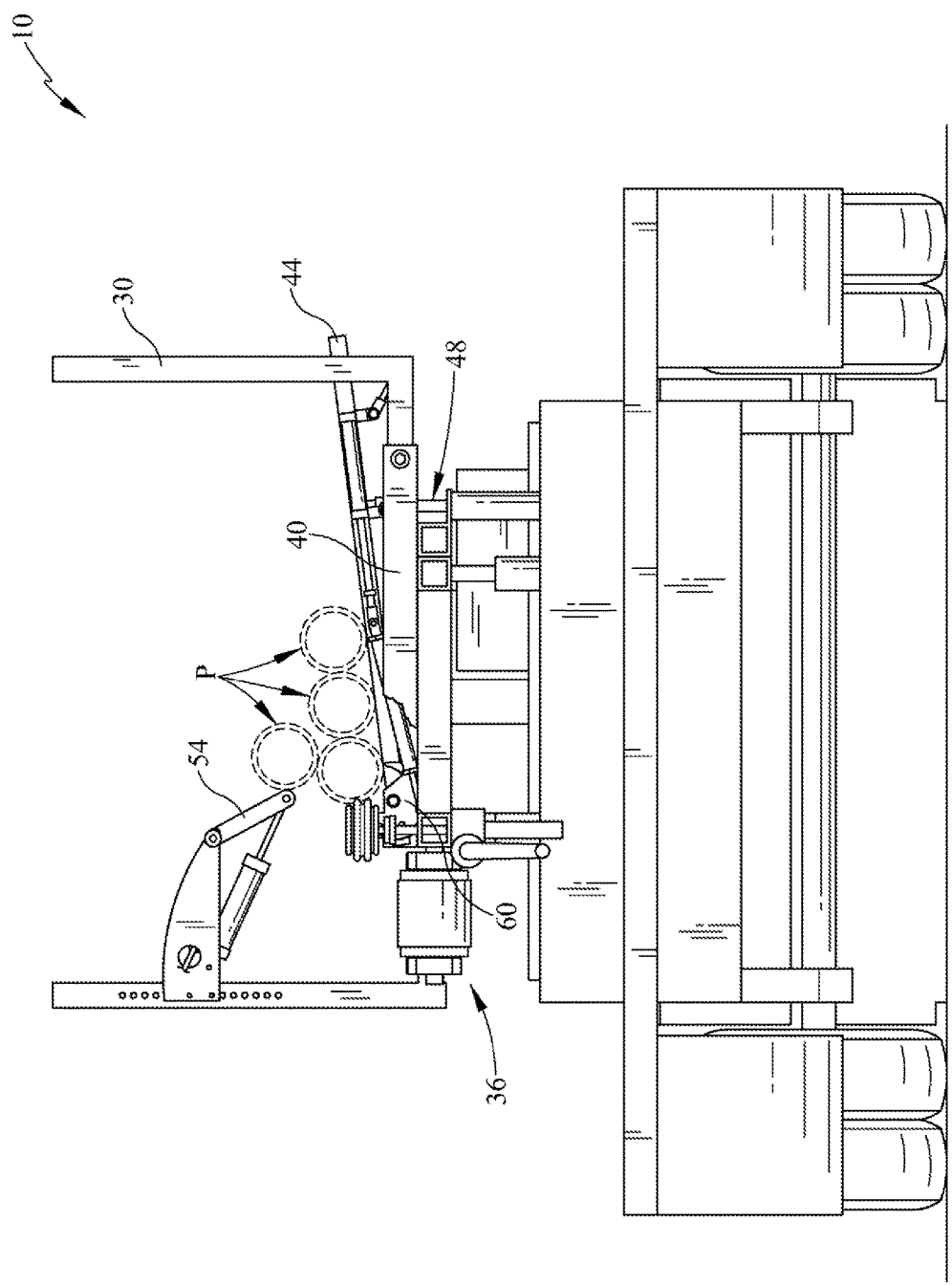
FIG. 5 is a rear view of the gravity member in a second position.

Referring now to FIG. 5, the gravity member 44 is moved to a second position. The actuator 48 is retracted to move the gravity member 44 to a lower position which is flat or almost flat and is best seen by comparison with FIG. 4 and the gravity member 44 position relative to the upright support 30. The gravity member 44 is moved to a lower position in order to cause movement of pipes and to effectuate a clearing of a jam or impingement. Alternatively, the movement may further provide for unbinding of pipes which are slightly twisted when loaded or stacked in the vehicle bed 15 (FIG. 1). As compared with the embodiment of FIG. 4, the movement of gravity member 44 is also clearly depicted by the movement of the actuator 48 to the level or elevation of the sleeve 40.

The combination of the movement of the gravity member 44 and the movement of the gate 54 provide two means for clearing jams or impingements and of pipes P while also allowing a single pipe to pass to the transition cradle 60.

Figure 6:
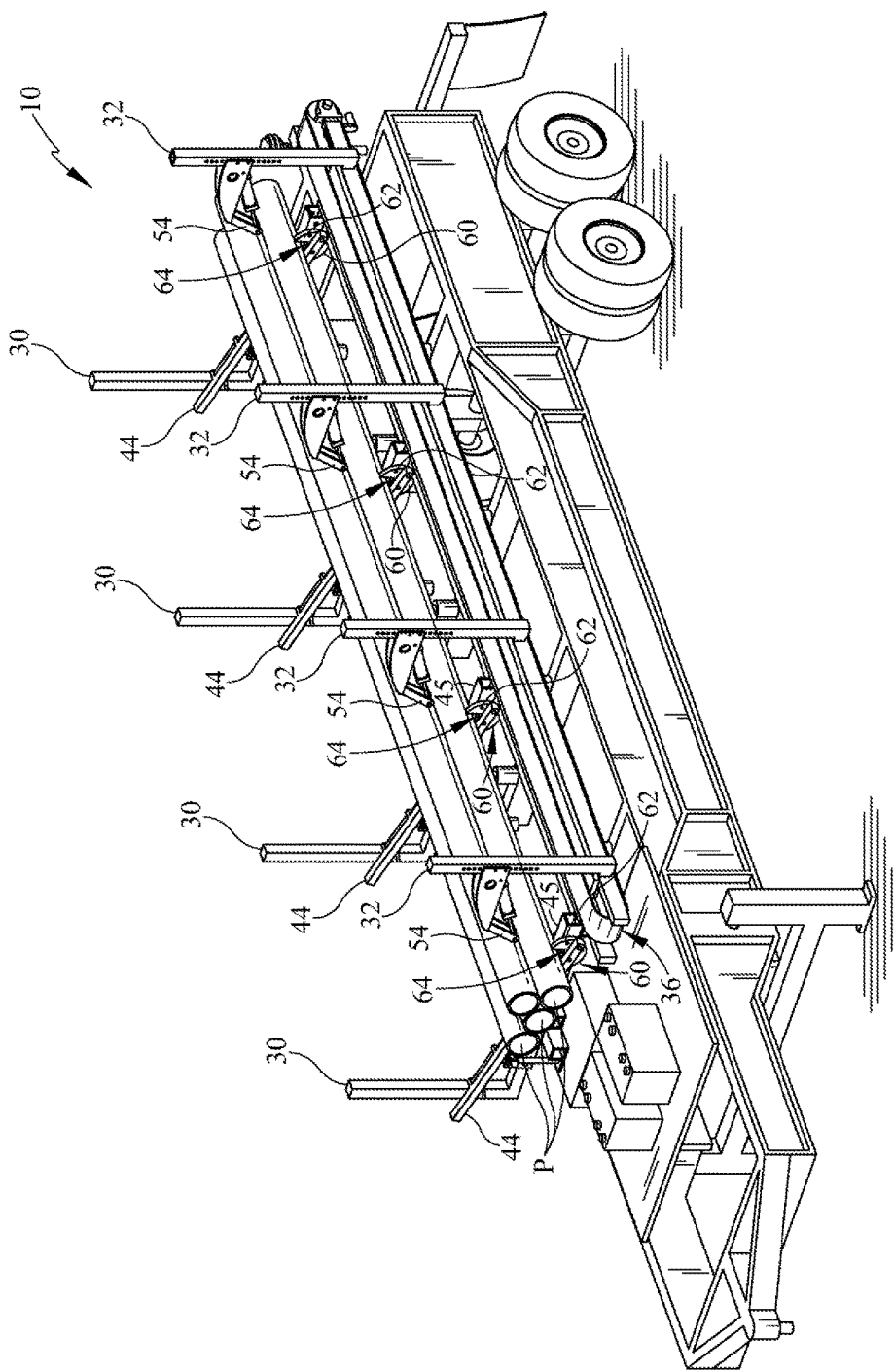
FIG. 6 is a perspective view of a pipe being received by a transition cradle.

Referring now to FIG. 6, a perspective view of the vehicle 10 is depicted. The embodiment shows the upright supports 30, 32 and the gravity members 44 upon which the plurality of pipes P are disposed. Near the first end 45 of the gravity members 44 is a transition cradle 60. The transition cradle 60 is generally has at least a partially round periphery 62 and a notch 64. The notch 64 is sized to fit a single pipe therein and may be of some preselected size to work with various diameters. Further, an insert (not shown) may be used to decrease the size of the notch 64 so that smaller pipes may also be fed from the gravity member 44 to the conveyor 36.

In FIG. 6, the notch 64 is sized to receive pipes P one at a time from the gravity member 44. Additionally, the gate 54 is disposed to provide for the opening O (FIG. 4), which only allows a single pipe to move into the notch 64 and on to the conveyor 36. The gate 54 holds back pipes P which are stacked up above the pipe P desired to be moved on to the conveyor 36. Still further, the rounded periphery 62 of the transition cradle 60 inhibits catching or binding as the transition cradle 60 rotates. Thus, the transition cradle 60 is also able to hold pipes P back on the gravity members 44.

Figure 7:
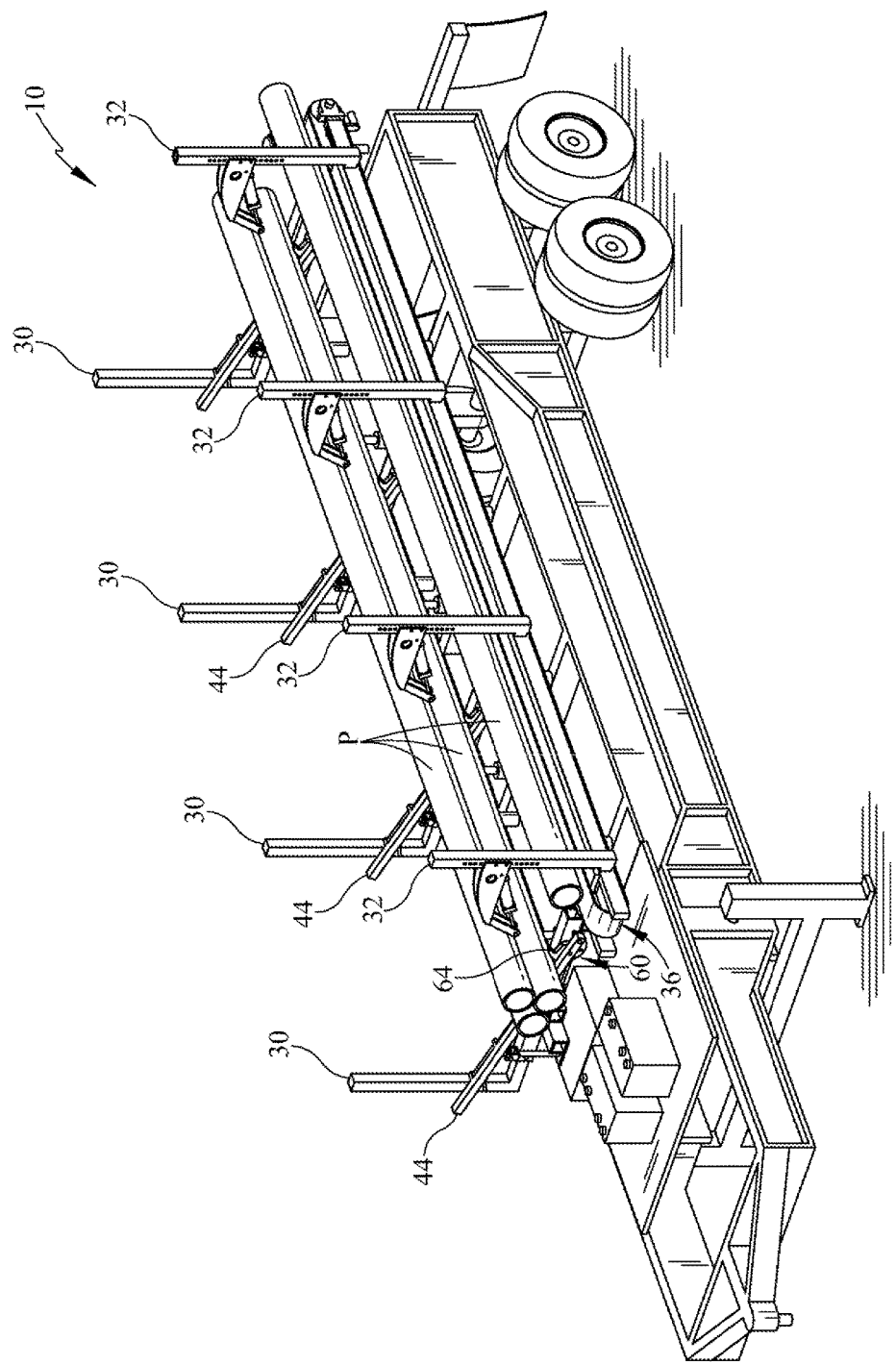
FIG. 7 is a perspective view of the transition cradle loading the pipe of FIG. 6 on to a conveyor.

Referring now to FIG. 7, a perspective view of the vehicle 10 is depicted and the transition cradle 60 is rotated from the position shown in FIG. 6. With this rotation, the notch 64 is turned toward the conveyor 36. With the notch 64 rotated toward the conveyor 36, a single pipe P is allowed to move on to the conveyor 36 and subsequently can be expelled from the vehicle 10 to a desired position for installation. Further, the transition cradle 60 is rotated such that the round periphery 62 of the transition cradle 60 aids to engage and hold back pipes P which are on the uphill side of the transition cradle 60. The rounded periphery 62 aids to inhibit any catching or binding due to the rounded surface of the pipes P and the round surface of the transition cradle 60. The rotation of the transition cradle 60 may be performed in various manners and according to some embodiments, the cradle 60 may be operably connected to an actuator and a linkage.

Referring now to FIGS. 8-13, a series of sequence views are depicted to show the movements of various components on the vehicle 10 which are utilized to feed pipe P from the gravity members 44 to the conveyor 36.

Figure 8:
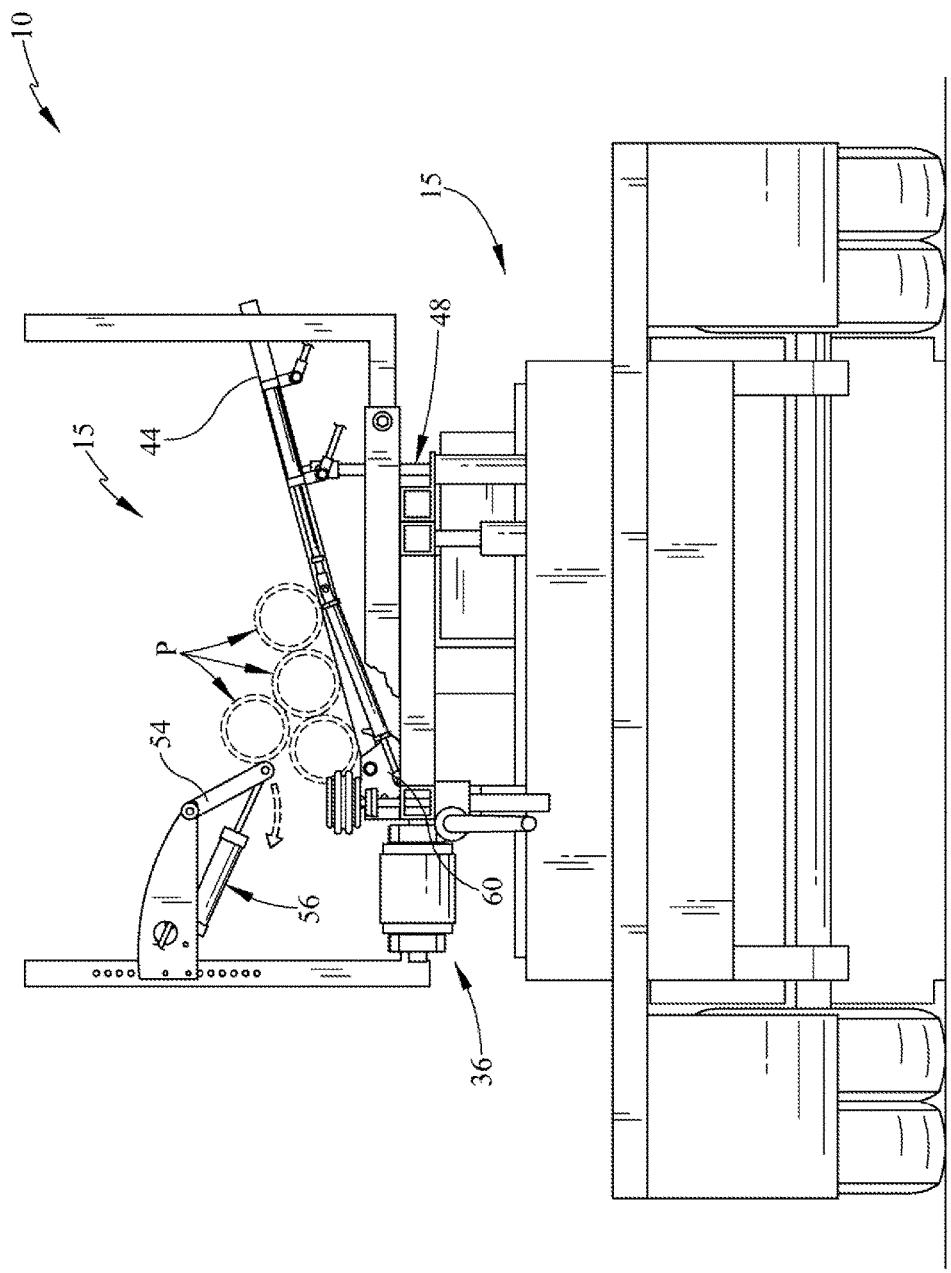
FIG. 8 is a first sequence view of the gate finger being actuated from a first position.

With reference first to FIG. 8, the gate 54 is shown actuated outwardly and the linear actuator 56 is shown in an extended position to hold back pipes P when the gravity member 44 is in at least one position. A broken arrow is depicted which represents a path of movement from the solid line position toward a second position shown in FIG. 9. As the gate 54 is moved outwardly or into the pipes P along the gravity member 44, the pipes P are pushed up hill so as to aid in allowing a single pipe below the gate 54 to move toward or into the transition cradle 60. While only four pipes P are depicted, one skilled in the art will recognize the pipes P may be stacked much higher than shown in the bed 15.

Figure 9:
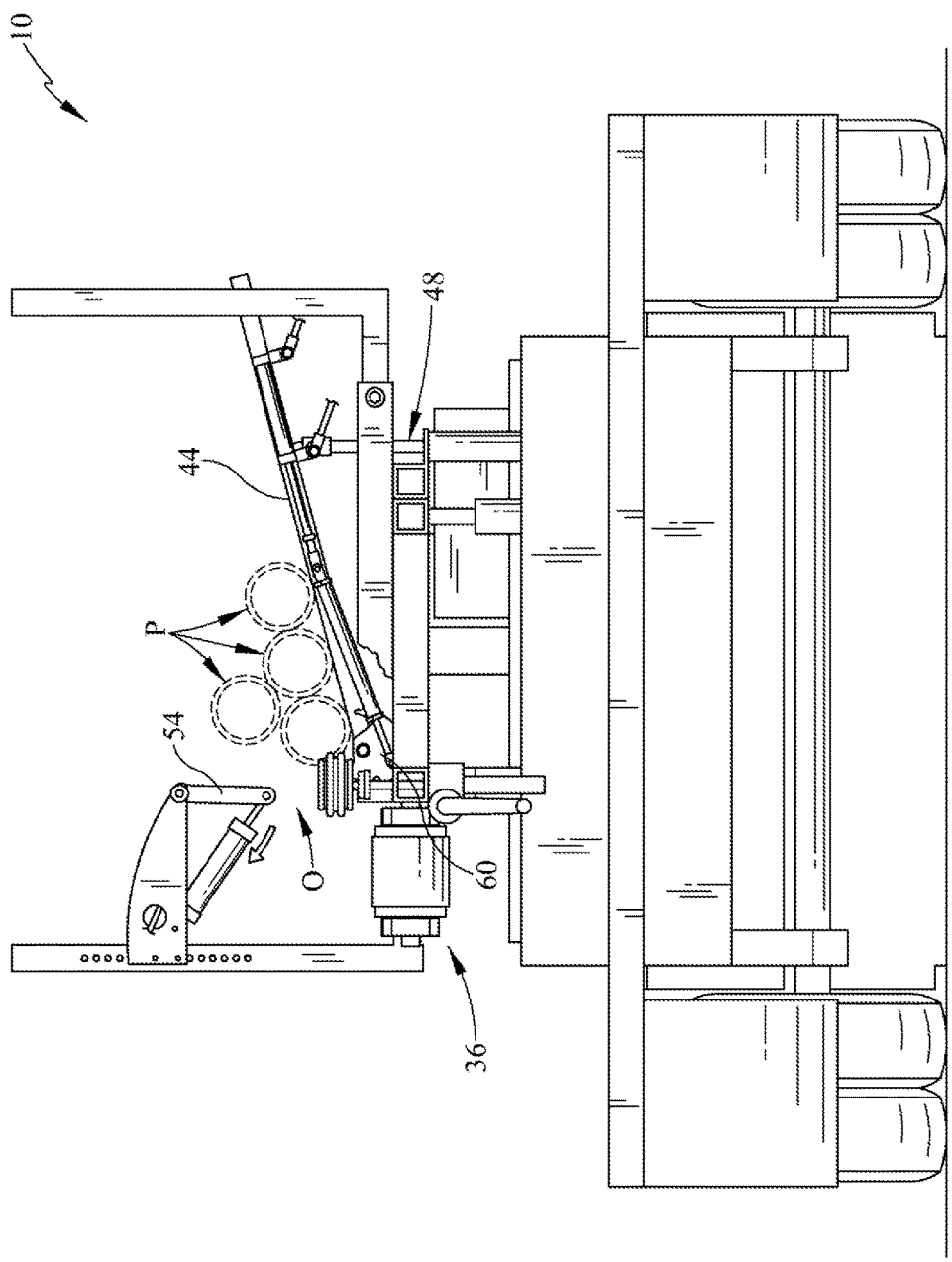
FIG. 9 is a second sequence view of the gate finger being actuated to the second position.

With reference now to FIG. 9, the gate 54 is actuated away from the pipes P which may allow the smallest opening O between gate 54 and gravity member 44. This may allow for movement of a single pipe P into the transition cradle 60 and further movement to the conveyor 36. Again, in this depiction, the gravity member 44 is positioned in an upper position so that the linear actuator 48 is extended.

Figure 10:
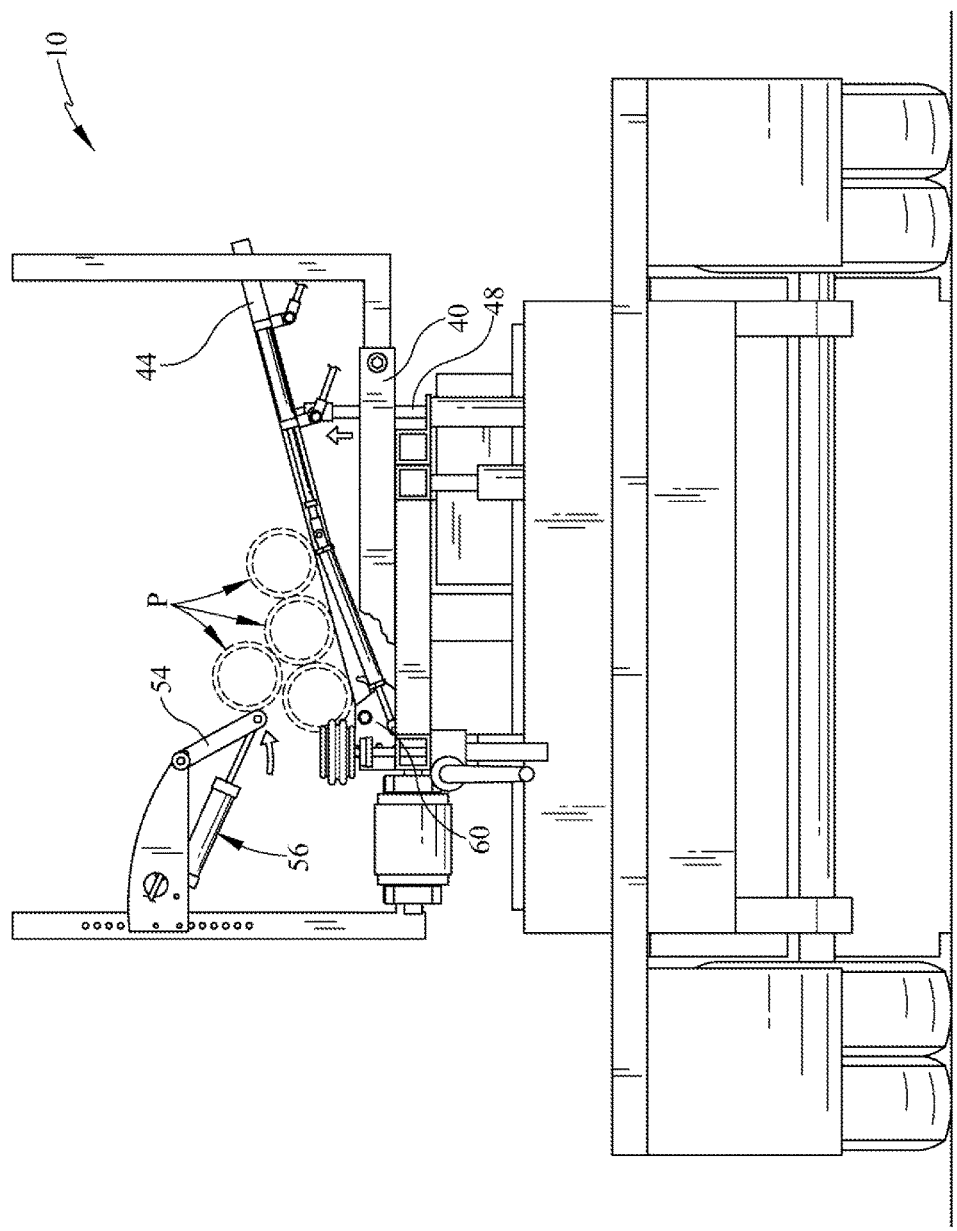
FIG. 10 is a first sequence view of the gravity member in a first position.
Figure 11:
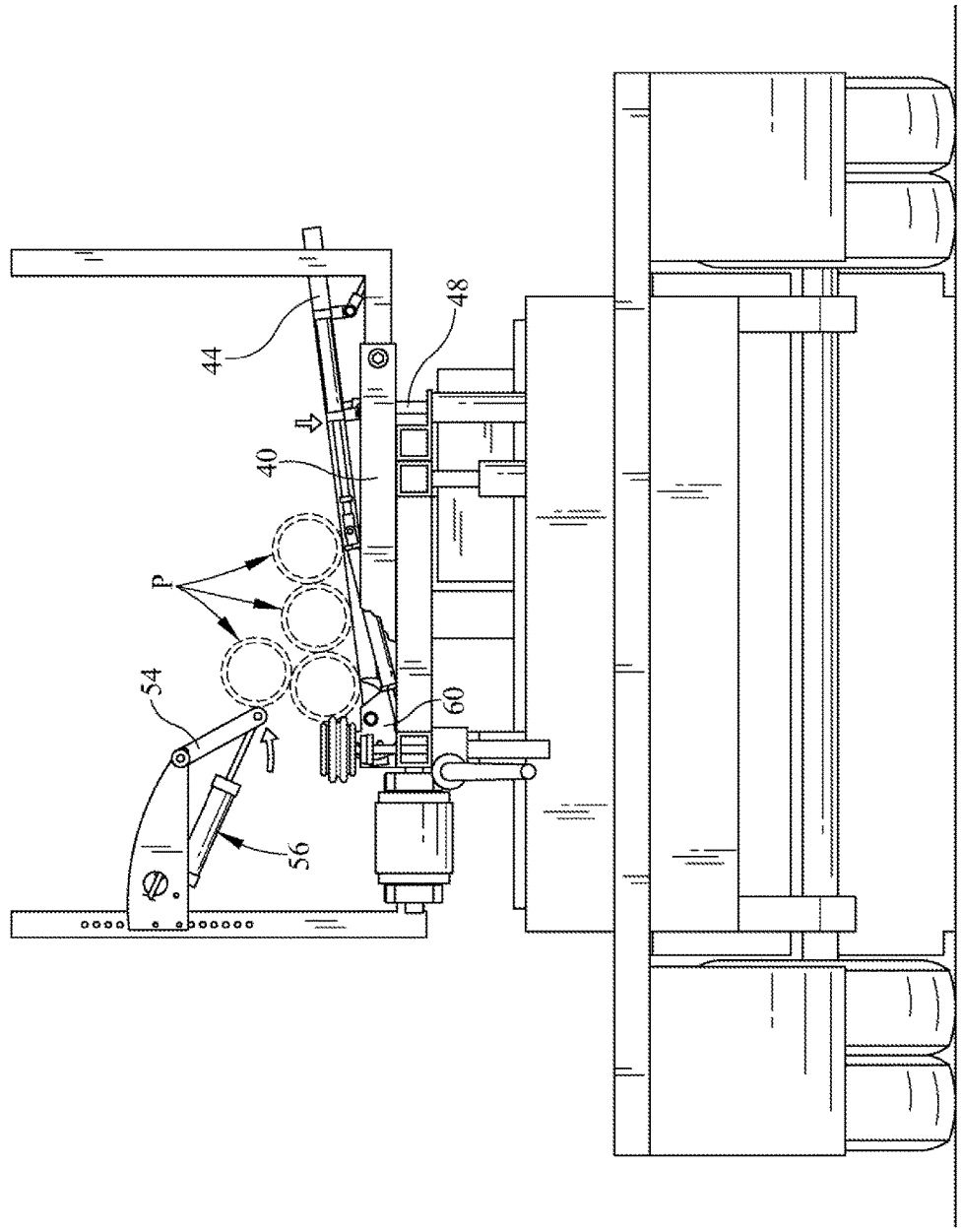
FIG. 11 is a second sequence view of the gravity member in a second position.

In FIG. 10, the gate 54 is moved outwardly again toward the pipes P to push the pipes backward or upwardly along the gravity member 44. The gravity member 44 is shown in an upper position and the actuator 48 is again extended. This movement outwardly of the gate 54 is one manner of clearing pipe jams that can occur when the pipes are located and stored on the gravity member 44. With additional reference to FIG. 11, in a second manner of clearing the jams, the linear actuator 48 is retracted so that the gravity member 44 moves downwardly toward the sleeve 40. This also aids to reduce jamming of the pipes P and free up impingement which precludes or inhibits pipes from properly feeding to the transition cradle 60. Once the jam or impingement is cleared either by movement of the gravity member 44 downwardly or the actuation of the gate 54.

Figure 12:
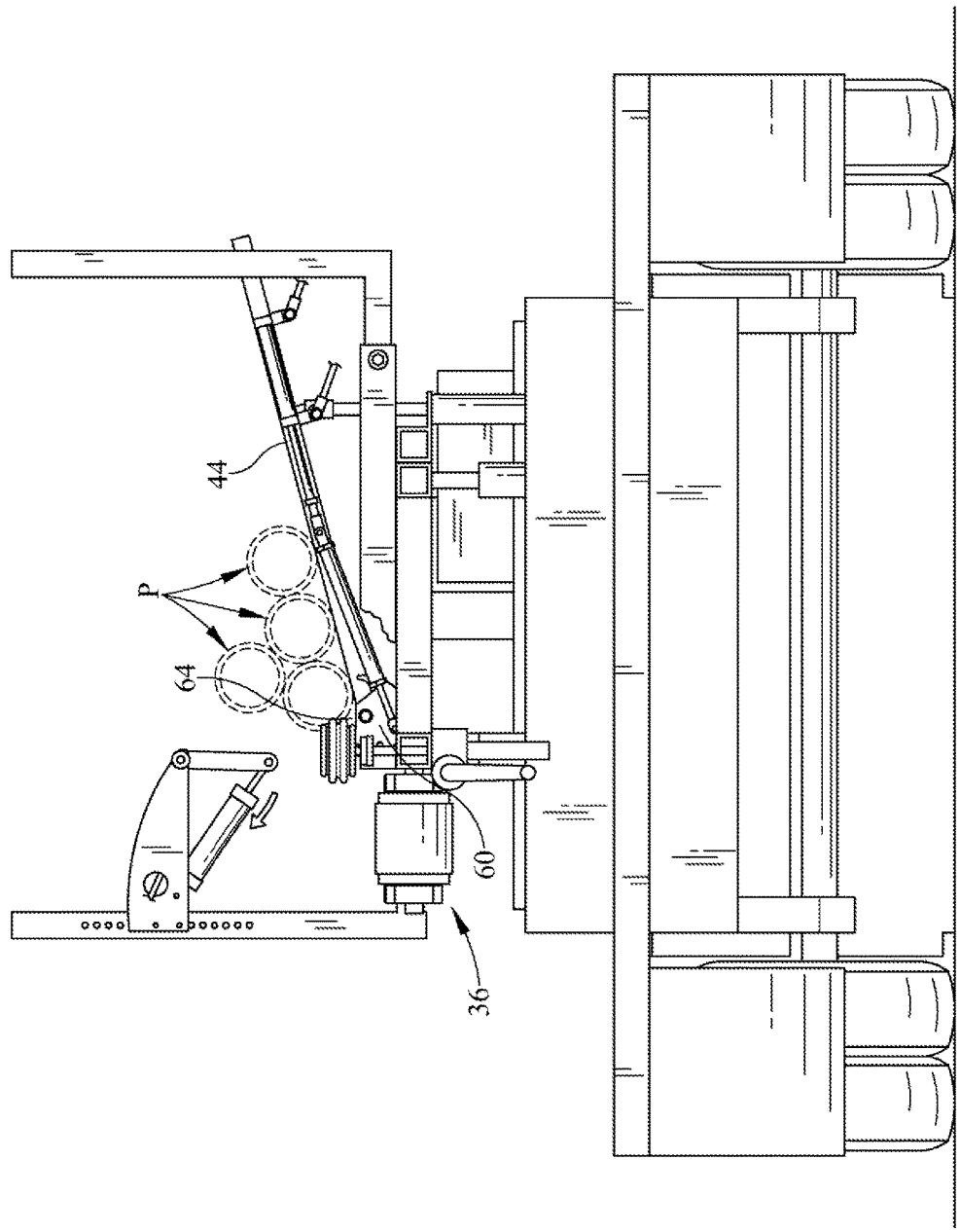
FIG. 12 is a first sequence view of the transition cradle in a first position.

With reference now to FIG. 12, the transition cradle 60 is shown in a first position wherein the notch 64 is generally directed toward the pipes P on the gravity member 44. The transition cradle 60 pivots relative to a gravity member 44 so that the notch 64 is either turned toward the gravity member 44 as shown or is turned away from the gravity member 44, toward conveyor 36. In this position, the clearing of jams will allow for feeding of one pipe P into the notch 64.

Figure 13:
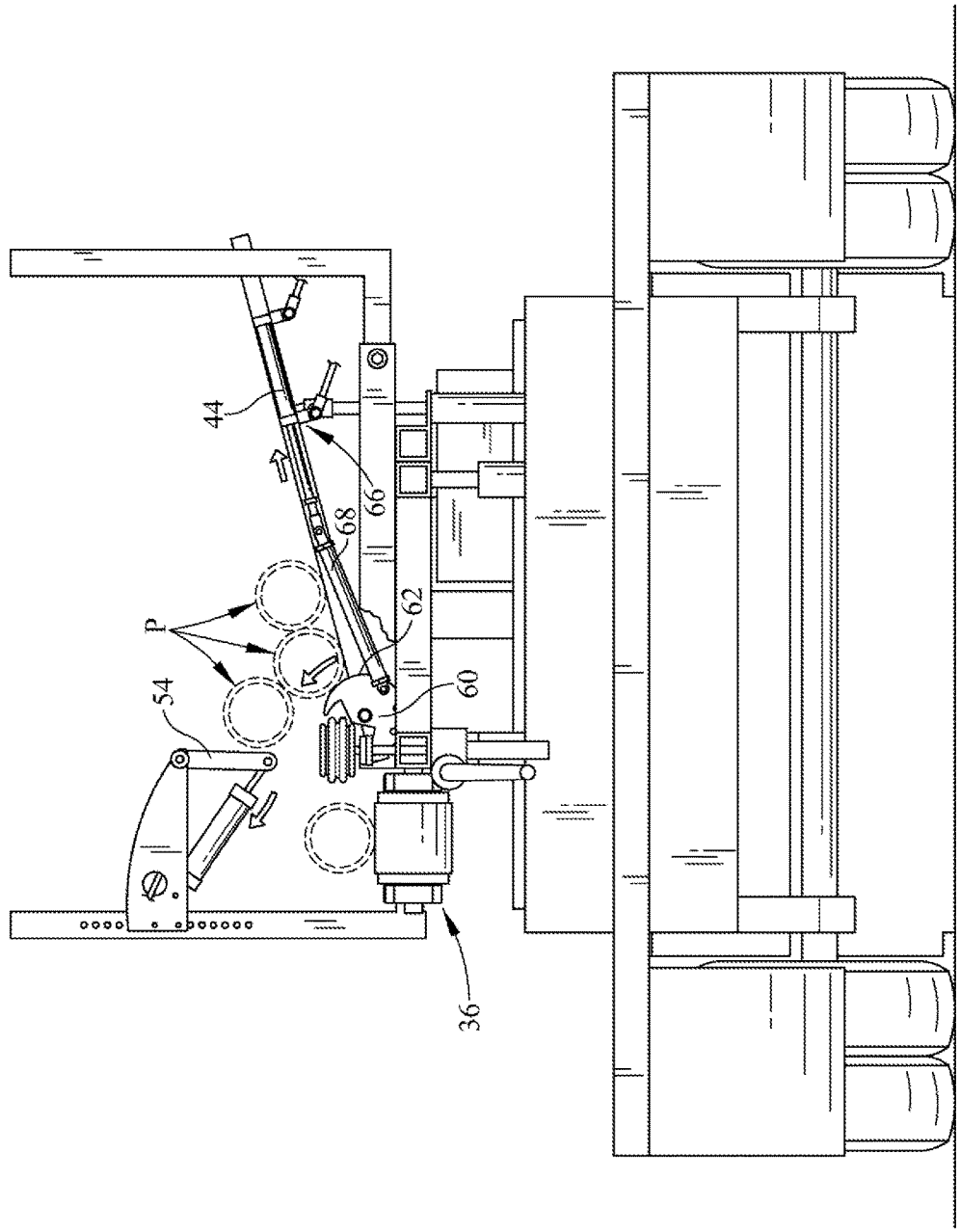
FIG. 13 is a second sequence view of the transition cradle in a second position.

With additional reference now to FIG. 13, the transition cradle 60 is rotated in a counter-clockwise direction relative to FIG. 12 and the periphery 62 engages the pipes P to hold the pipes back against the gravity member 44 and with the additional help of gate 54. The rotation also moves one of the pipes P that was previously within the notch 64 on to the conveyor 36.

The transition cradle 60 is actuated by an actuator 66. The actuator 66 of the depicted embodiment is linear and includes a linkage 68 which may be connected to the transition cradle 60. The movement of the actuator 66 causes the linkage 68 to pivot the transition cradle 60 between first and second positions and thereby move pipe P onto the conveyor 36. As with the previous actuator embodiments, this may be a linear actuator or a rotary actuator and also may be electric, hydraulic, pneumatic or some other form of actuated movement. In some embodiments, the actuator 66 may be mounted to the gravity member 44, but in other embodiments, the actuator 66 may be mounted in other locations.

Figure 14:
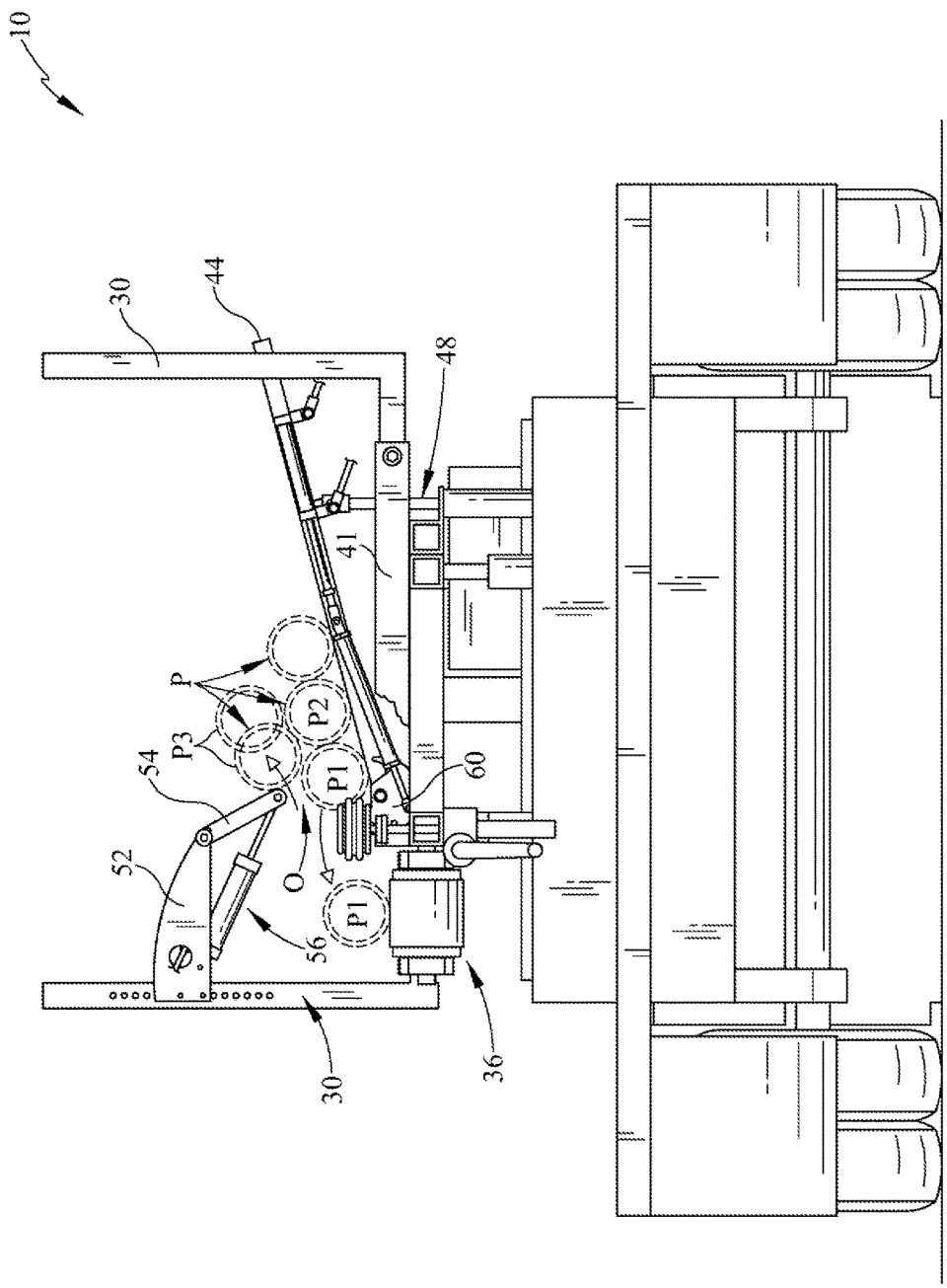
FIG. 14 is a first rear view of an embodiment of the vehicle and movement of the pipes; and, FIG. 15 is a second rear view of an embodiment of the vehicle and movement of the pipes.
Figure 15:
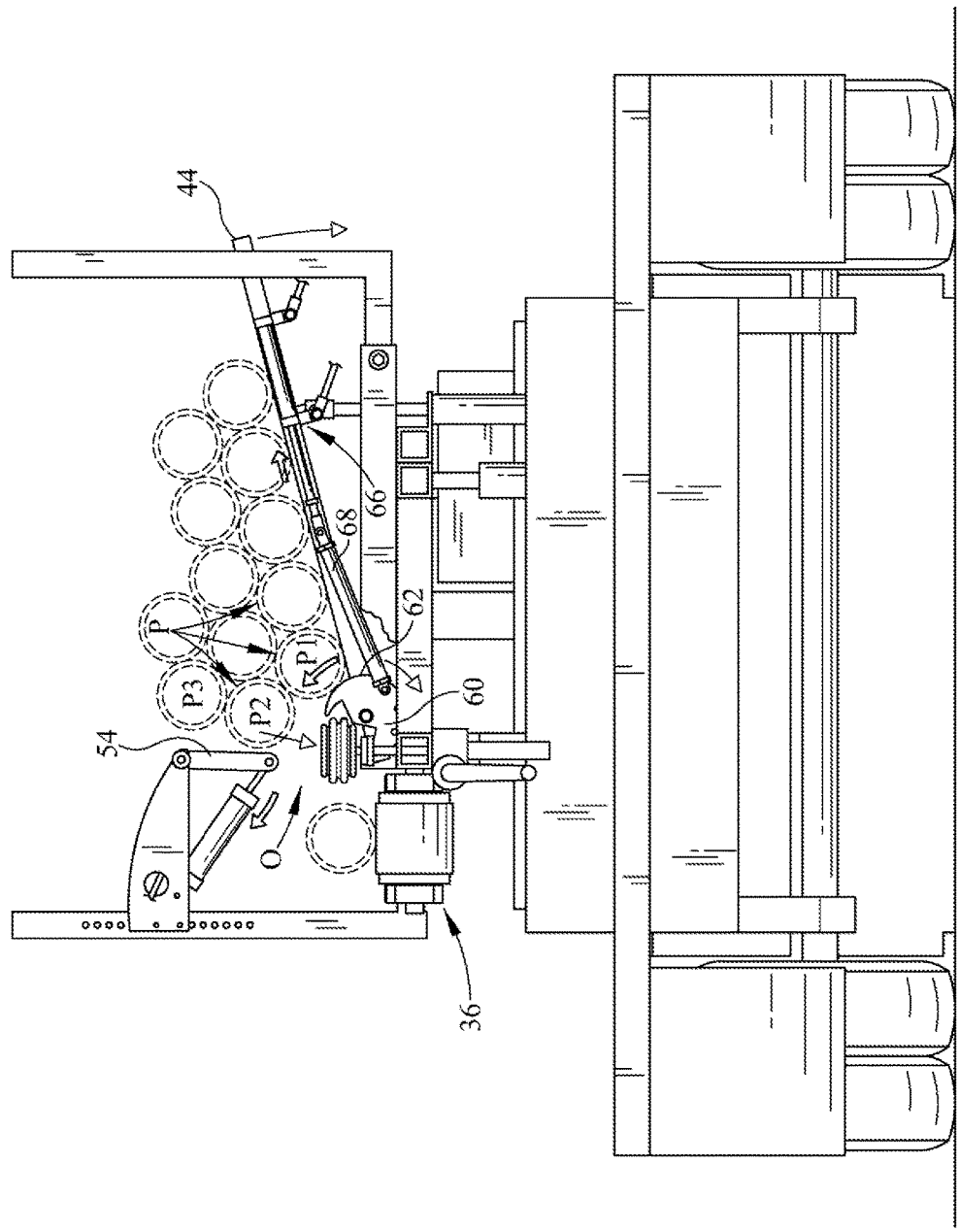

With reference to FIGS. 14 and 15, the operation of feeding the pipes to the conveyor 36 may be discussed and specifically the actuation of the gate 54, the gravity member 44 and the cradle 60. As previously set forth, in one position (FIG. 9, 15), the gate 54 merely sizes an opening O through which a single pipe P1 may be disposed on to the transition cradle 60 for movement on to the conveyor 36. The height may be adjusted, in part, by movement of the mount 52 to accommodate for larger pipes or control smaller pipes and the gate 54 may be actuated to provide minor adjustments to this position. The gate 54 may also be moved to a second position (FIGS. 10, 14) to push pipes P back away from the transition cradle 60. This may also be desirable when the transition cradle 60 is being actuated so that pipes P do not fall on or past the cradle 60 toward the conveyor 36. The pipes P are also held back by the rounded periphery or edge 62 of the transition cradle 60. As the gate 54 is returned to the first position, the next pipe P2 may move into a feed position as the transition cradle 60 rotates to deposit a pipe onto the conveyor 36 or to receive the subsequent pipe from the stack of pipes. The gate 54 may also be actuated to the second position when the feed piece moving into the cradle 60 is blocked or jammed by a pipe above. By actuating the gate 54, the adjacent top pipe is pushed back and the feed pipe below may move into the cradle. For example, as shown in FIG. 13, the upper pipe of the three in the stack is blocking the lower central pipe from moving on to the cradle 60. With reference now to FIG. 14, the gate 54 actuates pushing upper pipes P2, P3 back and allowing a lower pipe P1 to move on to the cradle and subsequently on to the conveyor 36.

The gravity member 44 may be moved for two reasons. First, the gravity member 44 may be lowered allow for additional pipes to be loaded on the vehicle 10. Second, the gravity member 44 may be actuated upward to assist in feeding a single pipe. By moving up or down, the movement of the pipe may be increased or decreased for feeding of the transition cradle 60 by increasing or decreasing slope. When lowered, the loading stress on the pipes is reduced which improves the ability of a feed piece to be dispensed.

The setup as shown in FIG. 15, depicts pipe P2 on the second, upper layer that would prohibit the lower, central pipe P1, closest to the transition cradle 60, from moving into the feed position. The design of the cradle 60 will allow for the upper pipe P2 on the second layer to fall into the feed position once the cradle 60 is opened back up. In the depicted arrangement, the lower pipe P1 closest to the cradle 60 may prohibit the upper pipe P2 from falling into feed position. By lowering the gravity member 44, this will relieve pressure and open up the space O to allow for P2 to fall into place. This method is common for a pipe load that has pipe pieces higher than one layer or level. The transition cradle 60 will act as a place holder and the bottom layer may not feed until much of the load above has already dispensed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A trailer for carrying and dispensing a plurality of pipes, comprising:
   a frame and a plurality of wheel assemblies to rotatably support said frame;
   a plurality of uprights disposed about said trailer to retain said pipes on said trailer;
   a plurality of articulating gravity members defining a floor for said pipes, said articulating gravity members being adjustable between a substantially flat position and an angled position;

said angled position directing said pipes toward one side of said trailer; and, at least some of said plurality of uprights being adjustable laterally to vary a width of said trailer.

2. The trailer of claim 1 further comprising a gate mount extending from said uprights.

3. The trailer of claim 1, said upright being adjustable to vary height of said uprights.

4. The trailer of claim 2 further comprising an actuatable gate extending from said gate mount.

5. The trailer of claim 4 wherein at least one of said gravity members and said actuatable gate may be moved to remove an impingement of said pipes.

6. The trailer of claim 1, said articulating gravity members being movable to remove an impingement of said pipes.

7. The trailer of claim 1 further comprising a conveyor disposed along one side of said trailer.

8. The trailer of claim 1 further comprising at least one rack at one of a forward or rearward end of said trailer.

9. The trailer of claim 1 further comprising a transition cradle having a notch and a rounded rear edge disposed on said articulating gravity members.

10. The trailer of claim 9 further comprising a linkage extending along said articulating gravity members.

11. The trailer of claim 10 further comprising an actuator operably connected to said linkage and said transition cradle.

\* \* \* \* \*